US012571668B1

(12) United States Patent
Thomas et al.

(10) Patent No.: US 12,571,668 B1
(45) Date of Patent: Mar. 10, 2026

(54) RADAR-TRANSPARENT THREADED MOUNT SYSTEM FOR LEVEL MONITORING DEVICE

(71) Applicant: Samsara Inc., San Francisco, CA (US)

(72) Inventors: Matthew David Thomas, Castro Valley, CA (US); Robert Baker, Phoenix, AZ (US); Jeffrey Mehlman, Pleasanton, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/232,997

(22) Filed: Jun. 10, 2025

(51) Int. Cl.
*G01F 23/284* (2006.01)

(52) U.S. Cl.
CPC .................................. *G01F 23/284* (2013.01)

(58) Field of Classification Search
CPC ..................................................... G01F 23/284
See application file for complete search history.

(56) References Cited

U.S. PATENT DOCUMENTS

| | | | | |
|---|---|---|---|---|
| 6,923,063 | B2 * | 8/2005 | Komninos | G01H 1/00 |
| | | | | 73/660 |
| 7,813,111 | B2 * | 10/2010 | Anderson | F21V 23/026 |
| | | | | 361/173 |
| 2007/0085752 | A1 * | 4/2007 | Kienzle | G01F 23/284 |
| | | | | 343/840 |
| 2007/0205781 | A1 * | 9/2007 | Eriksson | H01R 24/50 |
| | | | | 342/124 |
| 2010/0201563 | A1 * | 8/2010 | Flasza | G01F 23/284 |
| | | | | 342/124 |

| | | | | |
|---|---|---|---|---|
| 2012/0252244 | A1 * | 10/2012 | Elkins | G02B 6/3825 |
| | | | | 439/215 |
| 2016/0187179 | A1 * | 6/2016 | Hrncir | G01F 23/284 |
| | | | | 73/304 C |
| 2017/0141474 | A1 * | 5/2017 | Hengstler | H01Q 1/125 |
| 2019/0310125 | A1 * | 10/2019 | Farmanyan | G01S 13/106 |
| 2020/0003602 | A1 * | 1/2020 | Gurumohan | G01F 23/2962 |
| 2020/0217706 | A1 * | 7/2020 | Wildey | G01S 13/00 |
| 2022/0057250 | A1 * | 2/2022 | Bergeron | G01F 23/72 |
| 2022/0065683 | A1 * | 3/2022 | Wildey | G01S 7/032 |
| 2023/0077375 | A1 * | 3/2023 | Wildey | G01F 23/284 |
| | | | | 342/124 |
| 2023/0296420 | A1 * | 9/2023 | Siegfried | G01F 23/28 |
| | | | | 73/290 R |
| 2023/0417590 | A1 * | 12/2023 | Clark | H01Q 1/225 |
| 2024/0361170 | A1 * | 10/2024 | Kanoda | G01F 23/284 |
| 2024/0361171 | A1 * | 10/2024 | Tomoshi | G01F 23/284 |
| 2024/0361172 | A1 * | 10/2024 | Ishikawa | G01F 23/284 |
| 2024/0377240 | A1 * | 11/2024 | Oßwald | G01S 13/88 |
| 2025/0102345 | A1 * | 3/2025 | Tomoshi | G01F 23/804 |
| 2025/0102346 | A1 * | 3/2025 | Tomoshi | G01F 25/20 |
| 2025/0189360 | A1 * | 6/2025 | Gabrys | G01F 23/284 |

* cited by examiner

*Primary Examiner* — Peter M Bythrow
(74) *Attorney, Agent, or Firm* — Schwegman Lundberg & Woessner, P.A.

(57) ABSTRACT

A mounting adapter for radar-based monitoring devices includes a body formed of radar-transparent material having first and second ends. The first end includes a mounting interface for coupling with a monitoring device, while the second end includes a threaded interface for engaging with vessel openings. A blind end portion between the interfaces maintains vessel sealing. The adapter may include a hexagonal engagement surface with integrated drainage features. The radar-transparent material enables accurate measurements while providing chemical resistance and mechanical integrity.

20 Claims, 4 Drawing Sheets

400

404

402

RADAR-TRANSPARENT THREADED MOUNT SYSTEM FOR LEVEL MONITORING DEVICE

TECHNICAL FIELD

Embodiments of the present invention relate generally to mounting and attachment systems for monitoring devices used in industrial and commercial applications. More specifically, the disclosure relates to the field of sensor mounting configurations and adapters, including applications in process monitoring, fluid level detection, and industrial sensing systems. The disclosure further relates to modular mounting solutions that maintain measurement accuracy while providing reliable mechanical attachment in industrial environments.

BACKGROUND

In industrial and commercial environments, accurate monitoring of fluid levels and other process parameters is critical for operational efficiency and safety. Traditional monitoring methods often require operators to manually check levels by climbing onto tanks and using dipsticks or sight glasses, creating potential safety hazards and inefficient use of personnel time.

While automated monitoring solutions have emerged, mounting these devices on industrial vessels presents significant challenges. Existing mounting systems often require compromising the vessel's integrity or using mounting configurations that can interfere with measurement accuracy. This is particularly challenging for radar-based measurement systems, where the mounting interface can potentially distort or block the measurement signal.

Additionally, industrial environments present harsh conditions including exposure to various chemicals, temperature fluctuations, and mechanical stress. Mounting systems must maintain their integrity and measurement accuracy while withstanding these conditions. Current solutions often require choosing between robust mechanical attachment and measurement accuracy, forcing compromises in system performance.

Furthermore, the diverse nature of industrial vessels and tanks creates complexity in mounting configurations. Vessels may have different port sizes, thread types, or mounting surfaces, requiring facilities to maintain numerous mounting solutions or modify existing ones, leading to increased costs and potential reliability issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
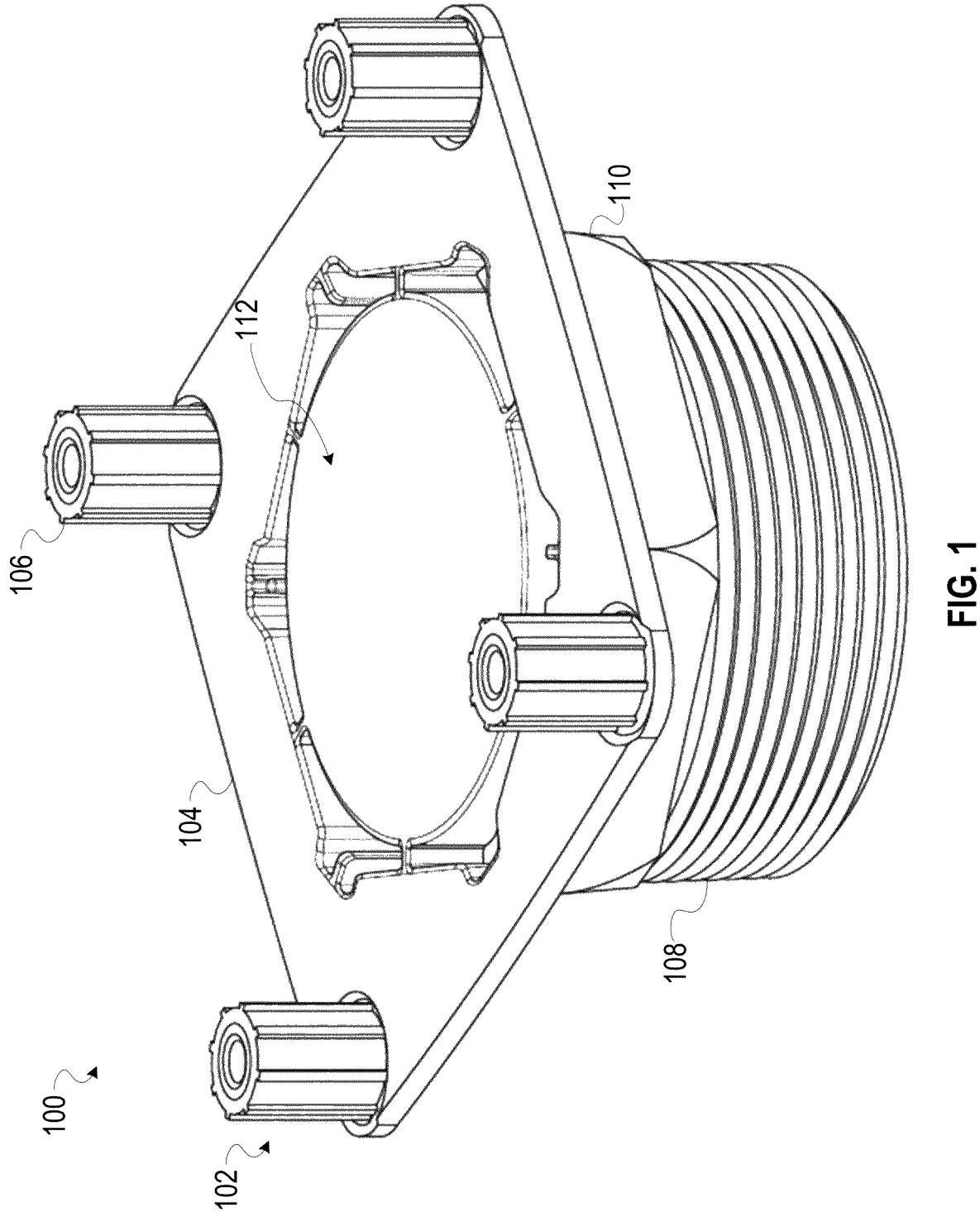
FIG. 1 provides an illustration of components of a mounting adapter system including a body, mounting interfaces, and attachment features, according to certain examples.

In industrial and commercial environments, monitoring fluid levels and other process parameters is critical for operational efficiency and safety. Traditional monitoring methods often require operators to manually check levels by climbing onto tanks and using dipsticks or sight glasses, creating potential safety hazards and inefficient use of personnel time.

While automated monitoring solutions have emerged, mounting these devices on industrial vessels presents significant challenges. Existing mounting systems often require compromising the vessel's integrity or using mounting configurations that can interfere with measurement accuracy. This is particularly challenging for radar-based measurement systems, where the mounting interface can potentially distort or block the measurement signal.

Additionally, industrial environments present harsh conditions including exposure to various chemicals, temperature fluctuations, and mechanical stress. Mounting systems must maintain their integrity and measurement accuracy while withstanding these conditions. Current solutions often require choosing between robust mechanical attachment and measurement accuracy, forcing compromises in system performance.

According to certain examples, the present disclosure provides mounting adapters for monitoring devices, including radar-based monitoring devices, that address these challenges. In some examples, a mounting adapter includes a body formed of a radar-transparent material having a first end and a second end. The first end includes a mounting interface configured to mechanically couple with a monitoring device, while the second end includes a mounting interface configured to engage with a vessel opening.

In some examples, the second mounting interface comprises an externally threaded portion that extends from the second end. For example, the externally threaded portion may comprise a 2-inch National Pipe Thread (NPT) configured to engage with standard industrial vessel openings. In other examples, the externally threaded portion may comprise other types of threads, such as British Standard Pipe Taper (BPT) threads or other tapered thread forms suitable for creating a tight seal with a corresponding threaded opening. Additionally, in some cases, the threaded portion may comprise a straight (non-tapered) thread, which may be used in combination with an O-ring, gasket, or other sealing component to ensure a secure and leak-resistant connection. The particular thread type used may depend on the requirements of the vessel, regional standards, or application-specific sealing considerations.

In some examples, the first mounting interface includes a plurality of mounting holes arranged in a pattern that aligns with corresponding mounting holes on the monitoring device. The first mounting interface may comprise a planar surface oriented perpendicular to a longitudinal axis of the body.

In some examples, the mounting adapter includes a blind end portion disposed between the first mounting interface and the second mounting interface. The blind end portion is configured to maintain vessel sealing when the second mounting interface is engaged with the vessel opening.

In some examples, the mounting adapter includes an engagement surface disposed between the first mounting interface and the second mounting interface to facilitate installation using standard tools. While a hexagonal engagement surface provides compatibility with common wrench sizes, other polygonal configurations may be used, such as square, octagonal, or other multi-sided engagement surfaces that can receive standard installation tools.

In some examples, the engagement surface may include knurled portions or other textured patterns that facilitate manual tightening without requiring tools. The engagement surface may also incorporate flats or recesses positioned at regular intervals around the circumference of the body to enable engagement with specialized installation tools.

In some examples, the engagement surface, regardless of its geometric configuration, extends radially outward from an outer surface of the body to provide sufficient surface area for tool engagement while maintaining structural integrity. The engagement surface may include reinforced sections to withstand installation torque while preserving the radar-transparent properties of the mounting adapter.

In some examples where drainage features are incorporated, the selected engagement surface geometry is configured to accommodate drainage holes. The drainage holes may be positioned within the engagement surface.

In some examples, the mounting adapter may be used in a monitoring system that includes a vessel having an opening and a radar-based monitoring device. The mounting adapter mechanically couples the monitoring device to the vessel while maintaining vessel sealing and measurement capabilities.

In some examples, the blind end portion has a thickness configured to maintain structural integrity while minimizing radar signal attenuation. This allows for reliable mechanical attachment while preserving measurement accuracy.

In some examples, the mounting holes in the first mounting interface are symmetrically arranged to allow multiple mounting orientations of the monitoring device.

In some examples, the hexagonal engagement surface includes recessed portions where the drainage holes are located. This configuration facilitates fluid drainage while maintaining the structural integrity of the engagement surface.

In some examples, the mounting adapter enables installation of the monitoring device above a vessel opening while maintaining vessel sealing and measurement capabilities through the adapter body.

FIG. 1 provides an illustration 100 of components of a mounting adapter system 102 including a body, mounting interfaces, and attachment features, according to certain examples. The mounting adapter system 102 includes a planar mounting surface 104 at a first end that is oriented perpendicular to a longitudinal axis of the body.

A first mounting interface 106 is provided at the first end and includes a plurality of mounting holes arranged in a pattern configured to align with corresponding mounting holes on a radar-based monitoring device. The mounting holes may be symmetrically arranged to allow multiple mounting orientations.

A second mounting interface 108 is disposed at an opposite end of the body and is configured to engage with a vessel opening. In some examples, the mounting interface includes a threaded portion that comprises a 2-inch National Pipe Thread (NPT) for compatibility with standard industrial vessel ports. In other embodiments, the threaded portion may comprise a British Standard Pipe Taper (BPT) thread or another form of tapered thread designed to provide a secure fit and seal with corresponding vessel openings. Alternatively, the threaded portion may comprise a straight thread (e.g., parallel thread), which may be used in conjunction with an O-ring, gasket, or other sealing element to achieve a leak-resistant seal. The type of thread used may vary depending on application requirements, regional standards, or user preferences.

Between the first and second mounting interfaces, an engagement surface 110 extends radially outward from the outer surface of the body. The engagement surface may take various configurations to facilitate installation and maintenance. In some examples, the engagement surface 110 has a hexagonal configuration to enable use of standard wrenches and tools commonly found in industrial environments.

In some examples, the engagement surface 110 may comprise alternative polygonal configurations such as square, octagonal, or other multi-sided geometries that can receive standard installation tools. The engagement surface 110 may also incorporate knurled portions or textured patterns around its circumference to enable manual tightening without requiring tools.

In some examples, the engagement surface 110 includes flats or recesses positioned at regular intervals around the circumference of the body to accommodate specialized installation tools. Regardless of the geometric configuration, the engagement surface 110 may extend radially outward from the body's outer surface to provide gripping area while maintaining structural integrity.

Figure 3:
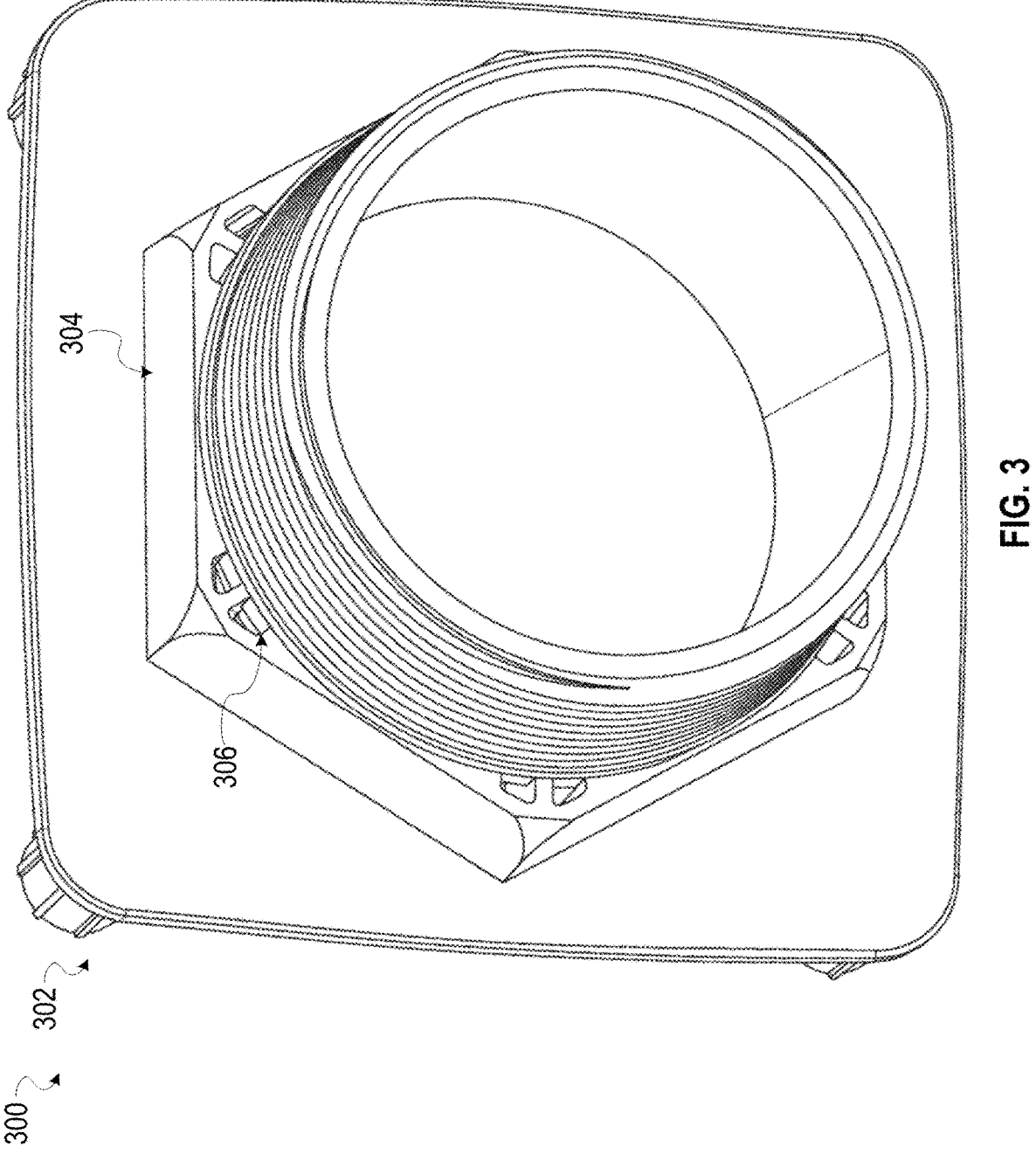
FIG. 3 provides an illustration of a mounting adapter with a threaded mounting configuration, according to certain examples.

The engagement surface 110 may include reinforced sections positioned to withstand installation torque while preserving the radar-transparent properties of the mounting adapter. In examples incorporating drainage features (as seen in FIG. 3), the engagement surface 110 geometry may be configured with drainage holes positioned for fluid drainage and mechanical strength. For example, as seen in FIG. 3, these drainage holes may be located within recessed portions of the engagement surface 110.

A blind end portion 112 is disposed between the first mounting interface 106 and the second mounting interface 108. The blind end portion 112 may configured to maintain vessel sealing when the second mounting interface is engaged with a vessel opening. The blind end portion 112 may have a thickness designed to maintain structural integrity while minimizing radar signal attenuation through the radar-transparent material of the body.

Figure 2:
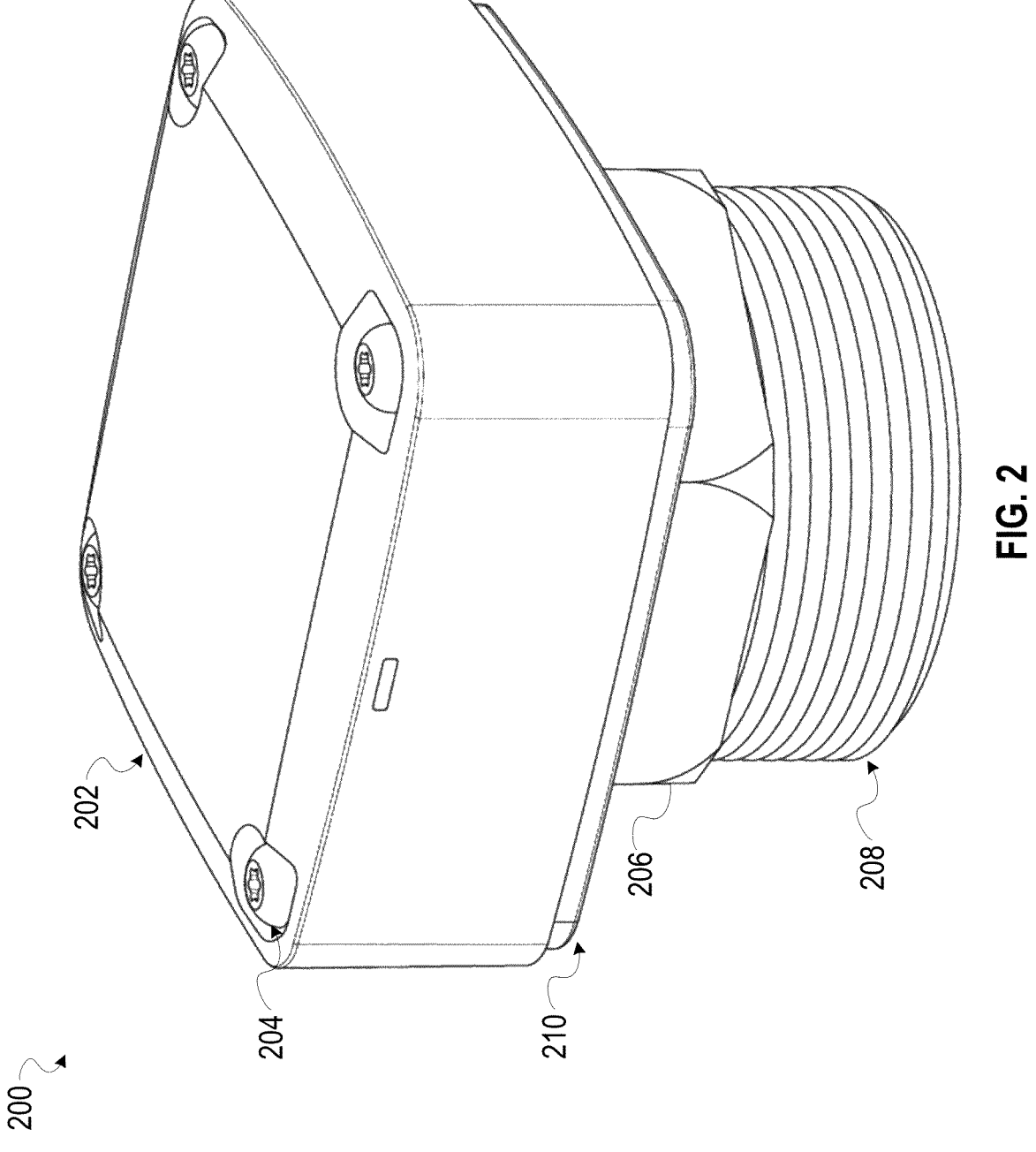
FIG. 2 provides an illustration of a monitoring device coupled with a mounting adapter, according to certain examples.

FIG. 2 provides an illustration 200 of a monitoring device 202 coupled with a mounting adapter 210, according to certain examples. The monitoring device 202 includes a mounting interface 204 having a plurality of mounting holes arranged in a pattern that aligns with corresponding mounting holes on the first mounting interface of the mounting adapter 210.

In some examples, the mounting adapter 210 includes an engagement surface 206 extending radially outward from the body to facilitate installation. In some examples, the engagement surface 206 may include reinforced sections to withstand installation torque while preserving radar-transparent properties.

A second mounting interface 208 may extend from the lower end of the mounting adapter 210 and include an externally threaded portion configured to engage with a vessel opening. In some examples, the threaded portion comprises a 2-inch National Pipe Thread (NPT) for compatibility with standard industrial vessel ports. The threaded configuration may also be provided in other standard NPT sizes, such as 1.5-inch NPT or 1-inch NPT, to accommodate different vessel port configurations. In other examples, the threaded portion may comprise a BPT thread or another tapered thread type commonly used in industrial applications for fluid-tight connections. Alternatively, the threaded portion may comprise a straight (non-tapered) thread, such as UNS or metric parallel threads, which may be used in combination with sealing components such as O-rings, gaskets, bonded washers, or flat face seals to achieve a fluid-tight seal.

In some examples, the second mounting interface may comply with ISO or DIN thread standards to support compatibility with international systems. The threaded portion may also be designed to interface with sanitary fittings, such as tri-clamp (tri-clover) connectors or other hygienic thread standards (e.g., SMS, RJT, or DIN 11851) used in food, pharmaceutical, or biotech applications.

In some examples, the threaded portion can be used in conjunction with off-the-shelf plumbing pieces, such as threaded bushings, reducers, or couplings, to adapt to larger or smaller vessel ports without requiring modification of the mounting adapter itself.

The monitoring device 202 is configured to transmit radar signals through the radar-transparent material of the mounting adapter body. The radar signals pass through the blind end portion and second mounting interface 208 to measure the contents of the vessel. The radar-transparent material is selected to provide consistent transmission properties and minimize signal attenuation while maintaining structural integrity and chemical resistance.

FIG. 3 provides an illustration 300 of a mounting adapter 302 that includes an engagement surface 304 with at least one drain hole 306 extending through it. The drain hole 306 passes through the engagement surface 304 from a bottom side to a top side of the mounting adapter 302 to facilitate drainage of accumulated fluid.

In some examples, multiple drain holes may be positioned around the engagement surface to provide drainage. The drain holes may be formed within recessed portions or pockets of the engagement surface 304.

In some examples, the drain holes 306 may be angled or configured with specific geometries to direct fluid flow in desired directions. The size and shape of the drain holes may be optimized to balance drainage capacity with structural requirements of the mounting adapter.

Figure 4:
FIG. 4 provides an illustration of a monitoring system installed on an industrial vessel, according to certain examples
Figure 4:
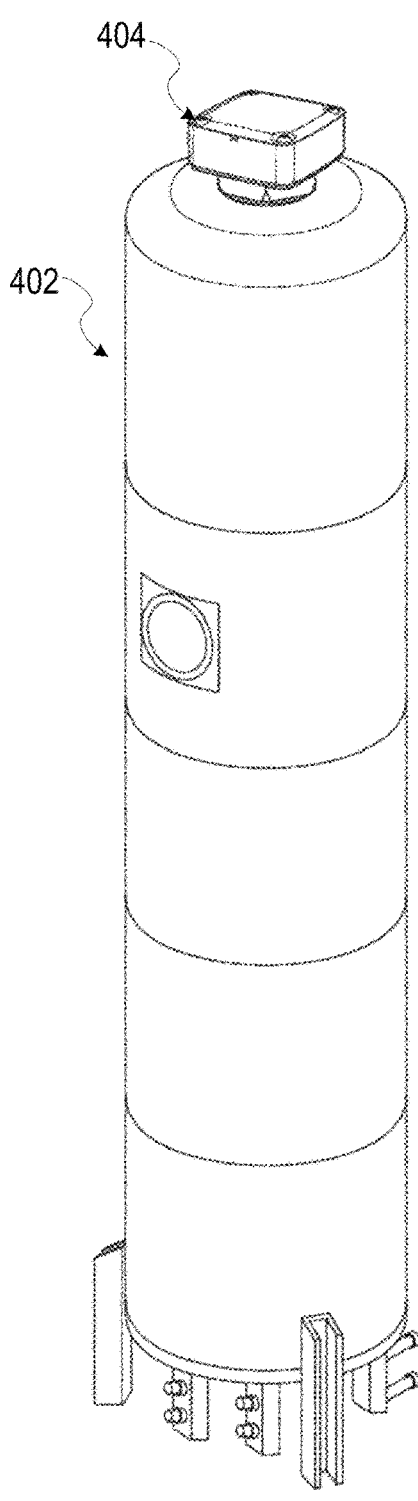

FIG. 4 provides an illustration 400 of a monitoring system installed on an industrial vessel 402, according to certain examples. The system includes a radar-based monitoring device 404 mounted on the vessel 402 using a mounting adapter 406. The mounting adapter 406 engages with an opening in the vessel 402 to provide a mounting interface while enabling radar signals from the monitoring device 404 to pass through the radar-transparent material for measuring vessel contents.

In some examples, the mounting adapter 406 includes an externally threaded portion that engages with a corresponding threaded opening in the vessel 402. The mounting adapter 406 maintains vessel sealing through its blind end portion while allowing radar transmission between the monitoring device 404 and the vessel contents.

What is claimed is:

1. A mounting adapter for a radar-based monitoring device, comprising:
a body having a first end and a second end, the body formed of a radar-transparent material;
a first mounting interface at the first end configured to mechanically couple with the monitoring device;
an second mounting interface at the second end of the body and configured to engage with a vessel opening;
a hexagonal engagement surface for tool engagement that extends radially from the body of the mounting adapter, and is disposed between the first mounting surface and the second mounting surface, the hexagonal engagement surface comprising at least one drainage hole that extends through the engagement surface; and
a blind end portion disposed between the first mounting interface and the second mounting interface, the blind end portion configured to maintain vessel sealing when the second mounting interface is engaged with the vessel opening.

2. The mounting adapter of claim 1, wherein the second mounting interface comprises an externally threaded portion that extends from the second end.

3. The mounting adapter of claim 2, wherein the externally threaded portion comprises a National Pipe Thread (NPT).

4. The mounting adapter of claim 1, wherein the first mounting interface comprises a plurality of mounting holes arranged in a pattern that aligns with corresponding mounting holes on the monitoring device.

5. The mounting adapter of claim 1, wherein the first mounting interface comprises a planar surface perpendicular to a longitudinal axis of the body.

6. The mounting adapter of claim 1, further comprising at least one drain feature formed in the body.

7. The mounting adapter of claim 1, wherein hexagonal engagement surface comprises a recessed portion, and wherein the at least one drainage hole is located within the recessed portion.

8. The mounting adapter of claim 1, wherein the hexagonal engagement surface comprises a reinforcement.

9. The mounting adapter of claim 1, wherein the at least one drainage hole extends from a top side of the mounting adapter to a bottom side of the hexagonal engagement surface.

10. A monitoring system, comprising:
a vessel having an opening;
a monitoring device; and
a mounting adapter comprising:
a body having a first end and a second end, the body formed of a radar-transparent material;
a first mounting interface at the first end mechanically coupled with the monitoring device;
a second mounting interface at the second end of the body engaged with the vessel opening;
a hexagonal engagement surface for tool engagement that extends radially from the body of the mounting adapter, and is disposed between the first mounting surface and the second mounting surface, the hexagonal engagement surface comprising at least one drainage hole that extends through the engagement surface; and
a blind end portion disposed between the first mounting interface and the second mounting interface, the blind end portion maintaining vessel sealing.

11. The system of claim 10, wherein the second mounting interface comprises an externally threaded portion that extends from the second end.

12. The system of claim 11, wherein the externally threaded portion comprises a National Pipe Thread (NPT).

13. The system of claim 10, wherein the first mounting interface comprises a plurality of mounting holes arranged in a pattern that aligns with corresponding mounting holes on the monitoring device.

14. The system of claim 10, wherein the first mounting interface comprises a planar surface perpendicular to a longitudinal axis of the body.

15. The system of claim 1, wherein the mounting adapter further comprises at least one drain feature formed in the body.

16. The system of claim 1, wherein the hexagonal engagement surface comprises a recessed portion, and wherein the at least one drainage hole is located within the recessed portion.

17. The system of claim 1, wherein the hexagonal engagement surface comprises a reinforcement.

18. The system of claim 1, wherein the at least one drainage hole extends from a top side of the mounting adapter to a bottom side of the hexagonal engagement surface.

19. A monitoring device, comprising:

a monitoring device body;

a mounting surface having a plurality of mounting holes arranged in a pattern; and a mounting adapter coupled to the mounting surface, the mounting adapter comprising:

an adapter body having a first end and a second end, formed of the radar-transparent material;

a first mounting interface at the first end mechanically coupled to the mounting surface;

a second mounting interface at the second end configured to engage with a vessel opening;

a hexagonal engagement surface for tool engagement that extends radially from the body of the mounting adapter, and is disposed between the first mounting surface and the second mounting surface, the hexagonal engagement surface comprising at least one drainage hole that extends through the engagement surface; and a blind end portion disposed between the first mounting interface and the second mounting interface.

20. The radar-based monitoring device of claim 1, wherein the second mounting interface comprises an externally threaded portion that extends from the second end.

\* \* \* \* \*